US008041074B2

(12) United States Patent
Rhoads et al.

(10) Patent No.: US 8,041,074 B2
(45) Date of Patent: *Oct. 18, 2011

(54) CONTENT INDEXING AND SEARCHING USING CONTENT IDENTIFIERS AND ASSOCIATED METADATA

(75) Inventors: Geoffrey B. Rhoads, West Linn, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/120,150

(22) Filed: May 13, 2008

(65) Prior Publication Data

US 2008/0275906 A1 Nov. 6, 2008

Related U.S. Application Data

(60) Continuation of application No. 11/466,392, filed on Aug. 22, 2006, now Pat. No. 7,372,976, which is a continuation-in-part of application No. 10/118,468, filed on Apr. 5, 2002, now Pat. No. 7,095,871, said application No. 11/466,392 is a continuation-in-part of application No. 10/869,320, filed on Jun. 15, 2004, now Pat. No. 7,130,087, which is a continuation of application No. 09/975,739, filed on Oct. 10, 2001, now Pat. No. 6,750,985, which is a division of application No. 09/127,502, filed on Jul. 31, 1998, now Pat. No. 6,345,104, said application No. 11/466,392 is a continuation-in-part of application No. 09/952,384, filed on Sep. 11, 2001, now Pat. No. 7,756,892, which is a continuation-in-part of application No. 09/620,019, filed on Jul. 20, 2000, now Pat. No. 7,689,532, said application No. 11/466,392 is a continuation-in-part of application No. 09/636,102, filed on Aug. 10, 2000, now abandoned, said application No. 11/466,392 is a continuation-in-part of application No. 09/840,018, filed on Apr. 20, 2001, now Pat. No. 7,209,571, which is a continuation-in-part of application No. 09/507,096, filed on Feb. 17, 2000, now abandoned, which is a continuation-in-part of application No. 09/482,786, filed on Jan. 13, 2000, now Pat. No. 7,010,144.

(60) Provisional application No. 60/282,205, filed on Apr. 6, 2001, provisional application No. 60/082,228, filed on Apr. 16, 1998, provisional application No. 60/232,163, filed on Sep. 11, 2000, provisional application No. 60/257,822, filed on Dec. 21, 2000, provisional application No. 60/191,778, filed on Mar. 24, 2000.

(51) Int. Cl.
*H04K 1/00* (2006.01)
(52) U.S. Cl. ...................................... 382/100
(58) Field of Classification Search .............. 382/100, 382/305, 306; 707/1, 3, 9, 10, 100, 102, 707/200, 203–205; 709/201, 217–219, 227–231; 715/500, 500.1, 501.1, 513–516, 733
See application file for complete search history.

(56) References Cited

U.S. PATENT DOCUMENTS 5,745,604 A 4/1998 Rhoads
(Continued)

OTHER PUBLICATIONS

U.S. Appl. No. 08/154,866, filed Nov. 18, 1993, Geoffrey B. Rhoads.

(Continued)

*Primary Examiner* — Jose L Couso

(57) ABSTRACT

A method of indexing content for network searching comprises obtaining media content signals stored on a computer network; deriving content identifiers from the content signals; using the content identifiers to obtain metadata used to classify the media content signals; and creating a searchable index of the media content signals based on the metadata, wherein users access the searchable index on the distributed computer network to submit a search query for the searchable index to retrieve links to the media content signals.

20 Claims, 3 Drawing Sheets

U.S. PATENT DOCUMENTS

| | | |
|---|---|---|
| 5,748,763 A | 5/1998 | Rhoads |
| 5,768,426 A | 6/1998 | Rhoads |
| 5,809,317 A | 9/1998 | Kogan |
| 5,841,978 A | 11/1998 | Rhoads |
| 5,850,481 A | 12/1998 | Rhoads |
| 5,860,074 A | 1/1999 | Rowe et al. |
| 5,862,260 A | 1/1999 | Rhoads |
| 5,862,325 A | 1/1999 | Reed et al. |
| 5,893,095 A | 4/1999 | Jain et al. |
| 5,911,139 A | 6/1999 | Jain et al. |
| 5,913,205 A | 6/1999 | Jain et al. |
| 5,915,250 A | 6/1999 | Jain et al. |
| 5,918,223 A | 6/1999 | Blum et al. |
| 5,956,716 A | 9/1999 | Kenner |
| 5,973,731 A | 10/1999 | Schwab |
| 5,983,237 A | 11/1999 | Jain et al. |
| 6,026,193 A | 2/2000 | Rhoads |
| 6,115,741 A | 9/2000 | Domenikos et al. |
| 6,122,392 A | 9/2000 | Rhoads |
| 6,122,403 A | 9/2000 | Rhoads |
| 6,243,480 B1 | 6/2001 | Zhao et al. |
| 6,243,713 B1 | 6/2001 | Nelson et al. |
| 6,266,430 B1 | 7/2001 | Rhoads |
| 6,285,776 B1 | 9/2001 | Rhoads |
| 6,289,108 B1 | 9/2001 | Rhoads |
| 6,330,335 B1 | 12/2001 | Rhoads |
| 6,332,163 B1 | 12/2001 | Bowman-Amuah |
| 6,343,138 B1 | 1/2002 | Rhoads |
| 6,353,672 B1 | 3/2002 | Rhoads |
| 6,360,234 B2 | 3/2002 | Jain et al. |
| 6,363,159 B1 | 3/2002 | Rhoads |
| 6,374,260 B1 | 4/2002 | Hoffert et al. |
| 6,389,151 B1 | 5/2002 | Carr et al. |
| 6,400,827 B1 | 6/2002 | Rhoads |
| 6,404,898 B1 | 6/2002 | Rhoads |
| 6,430,302 B2 | 8/2002 | Rhoads |
| 6,434,520 B1 | 8/2002 | Kanevsky et al. |
| 6,449,377 B1 | 9/2002 | Rhoads |
| 6,449,379 B1 | 9/2002 | Rhoads |
| 6,463,444 B1 | 10/2002 | Jain et al. |
| 6,496,591 B1 | 12/2002 | Rhoads |
| 6,505,160 B1 | 1/2003 | Levy et al. |
| 6,510,458 B1 | 1/2003 | Berstis et al. |
| 6,519,352 B2 | 2/2003 | Rhoads |
| 6,519,602 B2 | 2/2003 | Sundaresan et al. |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,560,349 B1 | 5/2003 | Rhoads |
| 6,560,350 B2 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,567,980 B1 | 5/2003 | Jain et al. |
| 6,574,350 B1 | 6/2003 | Rhoads et al. |
| 6,580,819 B1 | 6/2003 | Rhoads |
| 6,587,821 B1 | 7/2003 | Rhoads |
| 6,590,997 B2 | 7/2003 | Rhoads |
| 6,647,129 B2 | 11/2003 | Rhoads |
| 6,654,480 B2 | 11/2003 | Rhoads |
| 6,654,887 B2 | 11/2003 | Rhoads |
| 6,675,146 B2 | 1/2004 | Rhoads |
| 6,738,100 B2 | 5/2004 | Hampapur et al. |
| 6,738,495 B2 | 5/2004 | Rhoads et al. |
| 6,744,907 B2 | 6/2004 | Rhoads |
| 6,750,985 B2 | 6/2004 | Rhoads |
| 6,754,377 B2 | 6/2004 | Rhoads |
| 6,757,406 B2 | 6/2004 | Rhoads |
| 6,768,808 B2 | 7/2004 | Rhoads |
| 6,771,796 B2 | 8/2004 | Rhoads |
| 6,778,682 B2 | 8/2004 | Rhoads |
| 6,833,865 B1 | 12/2004 | Fuller et al. |
| 6,877,134 B1 | 4/2005 | Fuller et al. |
| 6,882,738 B2 | 4/2005 | Davis et al. |
| 6,944,298 B1 | 9/2005 | Rhoads |
| 6,959,386 B2 | 10/2005 | Rhoads |
| 6,970,573 B2 | 11/2005 | Carr et al. |
| 6,983,051 B1 | 1/2006 | Rhoads |
| 6,987,862 B2 | 1/2006 | Rhoads |
| 7,003,132 B2 | 2/2006 | Rhoads |
| 7,054,462 B2 | 5/2006 | Rhoads et al. |
| 7,054,463 B2 | 5/2006 | Rhoads et al. |
| 7,076,084 B2 | 7/2006 | Davis et al. |
| 7,095,871 B2 | 8/2006 | Jones et al. |
| 7,113,615 B2 | 9/2006 | Rhoads et al. |
| 7,130,087 B2 | 10/2006 | Rhoads |
| 7,171,016 B1 | 1/2007 | Rhoads |
| 7,181,022 B2 | 2/2007 | Rhoads |
| 7,184,570 B2 | 2/2007 | Rhoads |
| 7,222,163 B1 | 5/2007 | Girouard et al. |
| 7,242,790 B2 | 7/2007 | Rhoads |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,286,684 B2 | 10/2007 | Rhoads et al. |
| 7,302,574 B2 | 11/2007 | Conwell |
| 7,305,117 B2 | 12/2007 | Davis et al. |
| 7,313,253 B2 | 12/2007 | Davis et al. |
| 7,340,076 B2 | 3/2008 | Stach et al. |
| 7,349,552 B2 | 3/2008 | Levy |
| 7,359,528 B2 | 4/2008 | Rhoads |
| 7,372,976 B2 * | 5/2008 | Rhoads et al. ............... 382/100 |
| 7,415,129 B2 | 8/2008 | Rhoads |
| 7,418,111 B2 | 8/2008 | Rhoads |
| 7,424,132 B2 | 9/2008 | Rhoads |
| 7,450,734 B2 | 11/2008 | Rodriguez et al. |
| 7,486,799 B2 | 2/2009 | Rhoads |
| 7,499,564 B2 | 3/2009 | Rhoads |
| 7,536,555 B2 | 5/2009 | Rhoads |
| 7,539,325 B2 | 5/2009 | Rhoads et al. |
| 7,548,643 B2 | 6/2009 | Davis et al. |
| 7,555,139 B2 | 6/2009 | Rhoads et al. |
| 7,562,392 B1 | 7/2009 | Rhoads |
| 7,564,992 B2 | 7/2009 | Rhoads |
| 7,567,686 B2 | 7/2009 | Rhoads |
| 7,590,259 B2 | 9/2009 | Levy et al. |
| 7,593,576 B2 | 9/2009 | Meyer et al. |
| 7,602,940 B2 | 10/2009 | Rhoads et al. |
| 7,602,977 B2 | 10/2009 | Rhoads et al. |
| 7,606,390 B2 | 10/2009 | Rhoads |
| 7,639,837 B2 | 12/2009 | Carr et al. |
| 7,672,477 B2 | 3/2010 | Rhoads |
| 7,676,059 B2 | 3/2010 | Rhoads |
| 7,702,511 B2 | 4/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,837,094 B2 | 11/2010 | Rhoads |
| 2003/0021440 A1 | 1/2003 | Rhoads |
| 2003/0138128 A1 | 7/2003 | Rhoads |
| 2004/0057581 A1 | 3/2004 | Rhoads |
| 2004/0181671 A1 | 9/2004 | Brundage et al. |
| 2005/0216850 A1 | 9/2005 | Ramos et al. |
| 2006/0028689 A1 | 2/2006 | Perry et al. |
| 2006/0062386 A1 | 3/2006 | Rhoads |
| 2007/0016790 A1 | 1/2007 | Brundage et al. |
| 2007/0172098 A1 | 7/2007 | Rhoads et al. |
| 2007/0180251 A1 | 8/2007 | Carr et al. |
| 2007/0201835 A1 | 8/2007 | Rhoads |
| 2008/0131083 A1 | 6/2008 | Rhoads |
| 2008/0131084 A1 | 6/2008 | Rhoads |
| 2008/0149713 A1 | 6/2008 | Brundage |
| 2008/0253740 A1 | 10/2008 | Rhoads |
| 2008/0275906 A1 | 11/2008 | Rhoads et al. |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0040255 A1 | 2/2010 | Rhoads |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |

OTHER PUBLICATIONS

U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis, et al.
U.S. Appl. No. 09/496,380, filed Feb. 2, 2000, Geoffrey B. Rhoads.
U.S. Appl. No. 09/531,076, filed Mar. 18, 2000, Geoffrey B. Rhoads.
Benitez et al, Object-Based Multimedia Content Description Schemes and Applications for MPEG-7, Signal Processing—Image Communication, vol. 16, Issues 1-2, Sep. 2000, pp. 235-269.
Chang et al, Multimedia Search and Retrieval, a chapter in Advances in Multimedia—Systems, Standards, and Networks, New York-Marcel Dekker, 1999, 28 pp.
Convera Case Studies—National Basketball Association, 2001.
Huang et al, Multimedia Search and Retrieval—new Concepts, System Implementation, and Application, IEEE Trans on Circuits and Systems for Video Tech, vol. 10 No. 5, Aug. 2000, pp. 679-692.
Kang et al., Multimedia database system with embedding MPEG-7 meta data, Proc SPIE, vol. 4311, 2001, pp. 187-197.
Langelaar, Watermarking Digital Image and Video Data, IEEE Signal Processing Magazine, Sep. 2000, pp. 20-46.
Marques, Content-Based Visual Information Retrieval, Ch 3 in Distributed Multimedia Databases, 2003, 22 pp.
Nack, Everything You Wanted to Know About MPEG-7—Part 2, IEEE Multimedia. vol. 6, No. 4, pp. 64-73. Oct. 1999, 10 pp.
Rehm, Representing Internet Streaming Media Metadata using MPEG-7 Multimedia Description Schemes, Proceedings of the 2000 ACM workshops on Multimedia, 2000, 6 pp.
Sikora, The MPEG-7 Visual Standard for Content Description—An Overview, IEEE Transactions on Circuits and Systems for Video Technology, vol. 11, No. 6, Jun. 2001, pp. 696-702.
Villegas et al, An Environment for Efficient Handling of Digital Assets, Proc. of Workshop on Image Analysis for Multimedia Interactive Services, WIAMIS 2003, Apr. 2003, London, 8 pp.
Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.
Zhao et al., "Digital Watermark Mobile Agents," Proc. Of NISSC'99, Arlington, VA, Oct. 18-21, 1999, pp. 138-146.

* cited by examiner

CONTENT INDEXING AND SEARCHING USING CONTENT IDENTIFIERS AND ASSOCIATED METADATA

TECHNICAL FIELD

This patent application is a continuation of Ser. No. 11/466,392, filed Aug. 22, 2006 (now U.S. Pat. No. 7,372,976) which is a continuation in part of U.S. patent application Ser. No. 10/118,468, filed Apr. 5, 2002 (Now U.S. Pat. No. 7,095,871), which claims priority to U.S. Provisional Application 60/282,205, filed Apr. 6, 2001.

U.S. patent application Ser. No. 10/118,468 is also related to U.S. patent application Ser. No. 09/612,177, filed Jul. 6, 2000 (now U.S. Pat. No. 6,681,029), which is a continuation of U.S. patent application Ser. No. 08/746,613, filed Nov. 12, 1996 (now U.S. Pat. No. 6,122,403), which is a continuation in part of U.S. patent application Ser. No. 08/649,419, filed May 16, 1996 (now U.S. Pat. No. 5,862,260) and 08/508,083 filed Jul. 27, 1995 (now U.S. Pat. No. 5,841,978).

application Ser. No. 11/466,392 is also a continuation in part of U.S. patent application Ser. No. 09/952,384, filed Sep. 11, 2001, which is a continuation in part of U.S. patent application Ser. No. 09/620,019, filed Jul. 20, 2000. Application Ser. No. 09/952,384 also claims priority to U.S. Provisional Patent Application Nos. 60/232,163, filed Sep. 11, 2000, and 60/257,822, filed Dec. 21, 2000. Application Ser. No. 09/952,384 also claims priority to PCT Application PCT/US01/22953, filed Jul. 20, 2001.

application Ser. No. 11/466,392 is also a continuation in part of U.S. patent application Ser. No. 09/636,102, filed Aug. 10, 2000, which claims priority to U.S. Provisional Application No. 60/191,778, filed Mar. 24, 2000.

application Ser. No. 11/466,392 is also a continuation in part of U.S. patent application Ser. No. 09/840,018, filed Apr. 20, 2001, which is a continuation in part of U.S. patent application Ser. No. 09/507,096, filed Feb. 17, 2000, which is a continuation in part of U.S. patent application Ser. No. 09/482,786, filed Jan. 13, 2000 (Now U.S. Pat. No. 7,010,144).

The above patents and patent applications are hereby incorporated by reference.

BACKGROUND AND SUMMARY

As digital content continues to proliferate, management of digital assets becomes an increasingly difficult challenge. Enhancements in computer networking and database technology allow companies to manage large collections of images and other media and make the content available to third parties. While network communication provides a powerful tool to enable the manager of the database to share content with others, it makes it more difficult to control and track how the content is being used.

For example, some companies maintain extensive databases of images and other media content used to promote their products. Customers or service providers such as advertising and marketing firms can access this content remotely via extranet, web site, or other file transfer transactions. Though computer networking telecommunication technology facilitates access, it makes it difficult to ensure that the customers and services providers are getting the latest content, and that they are getting accurate and helpful information relating to the content.

In these applications, there is a need to enable digital asset management to reliably link media content with additional data about the content. One way to associate content with information about the content is to place the information in a file header or footer. This approach, however, is less effective because the information often does not survive file format changes, conversion to the analog domain, etc. Another way to associate multimedia content with other data is to hide identifying information in the content through data hiding or steganography. Steganography refers to a process of hiding information into a signal. One example of steganography is digital watermarking. Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other transform domain (e.g., Fourier, Discrete Cosine, Wavelet Transform domains). The reading component analyzes target content to detect whether a watermark is present. In applications where the watermark encodes information (e.g., a message), the reader extracts this information from the detected watermark.

The present assignee's work in content identification, steganography, data hiding and watermarking is reflected in U.S. Pat. No. 5,862,260; in co-pending application Ser. Nos. 09/503,881 (now U.S. Pat. No. 6,614,914) and 09/452,023 (now U.S. Pat. No. 6,408,082); and in published specifications WO 9953428 and WO0007356 (corresponding to U.S. Ser. No. 09/074,034 (now U.S. Pat. No. 6,449,377) and 09/127,502 (now U.S. Pat. No. 6,345,104)). A great many other approaches are familiar to those skilled in the art. The artisan is presumed to be familiar with the full range of literature about content identification, steganography, data hiding and watermarking. The subject matter of the present application is related to that disclosed in U.S. Pat. Nos. 5,862,260, 6,122,403 and in co-pending application Ser. No. 09/503,881 filed Feb. 14, 2000 (now U.S. Pat. No. 6,614,914), 60/198,857 filed Apr. 21, 2000, 09/571,422 filed May 15, 2000 (now U.S. Pat. No. 6,947,571), 09/620,019 filed Jul. 20, 2000, and 09/636,102 filed Aug. 10, 2000; which are hereby incorporated by reference.

One aspect of the invention is a method for processing media content that comprises obtaining media content signals from a computer network; deriving content identifiers from perceptible visual or audio content of the content signals; using the content identifiers to obtain metadata used to classify the media content signals; and creating a searchable index of the media content signals based on the metadata, wherein users access the searchable index on the computer network to submit a search query for the searchable index to retrieve links to the media content signals.

Another aspect of the invention is a method for searching for audio or images comprising, from a location in the distributed computer network, receiving a query for content signals related to a first content signal, the first content signal being part of the query; receiving a content identifier derived from perceptible audio or image data of the first content signal; using the content identifier to obtain metadata used to classify the first content signal; searching a searchable index of media content signals based on the metadata, which forms search criteria for the first content signal; and returning a set of search results including references to content signals stored in the distributed computer network that correspond to the search criteria.

Further features will become apparent with reference to the following detailed description and accompanying drawings.

DETAILED DESCRIPTION

Figure 1:
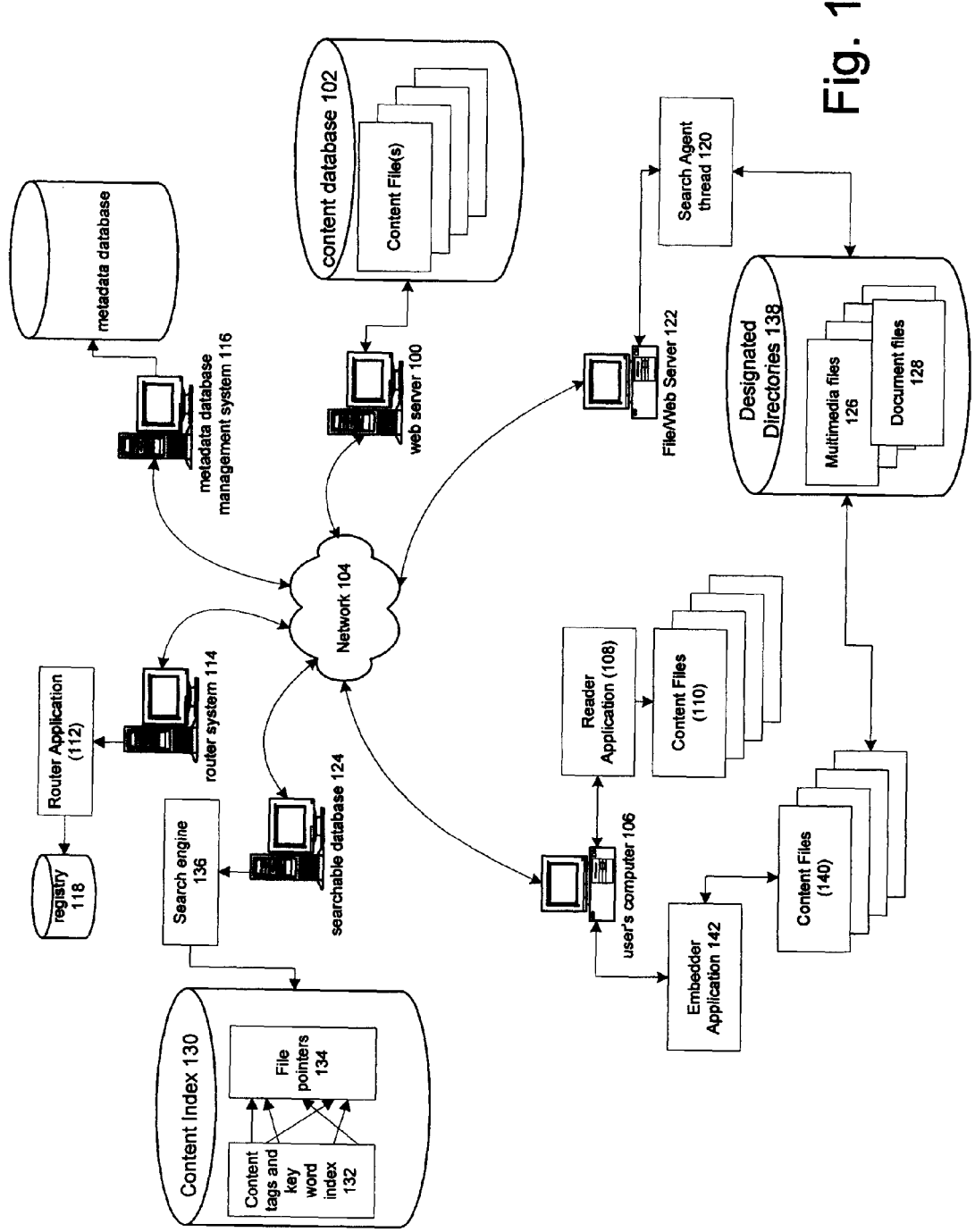
FIG. 1 illustrates a system for enhancing digital asset management by linking media content with metadata and actions associated with the content.

FIG. 1 illustrates a system for enhancing digital asset management by linking media content with metadata and actions associated with the content. The media content is maintained as a collection of media files (e.g., still image, audio, or video), stored or distributed on one or more devices, such as a web site 100, a content database 102, etc. User's of the content files are typically distributed in many locations, but are interconnected via a local area or wide area network 104. Each user accesses content through a network device such as a Personal Computer, set top box, network enabled audio or video player, personal digital assistant, smart phone, etc. The user's computer 106 shown in FIG. 1 is representative of the wide array of these types of devices.

The user's computer executes a watermark reader application 108 that decodes watermarks from content files 110, such as images, audio or video files. It includes network communication software for establishing a network communication with other systems on a network via TCP/IP. The reader application 108 communicates watermark information extracted from watermarked content to a router application 112 executing on a router system 114. The router application maps the watermark information to a corresponding metadata database management system 116 using a registry 118, which includes data records that include the watermark information and associated metadata database information. The router also includes communication software for receiving requests from reader applications and re-directing requests to the metadata database system 116.

The metadata database system 116 manages requests for information from router applications and reader applications. It includes a metadata database that stores information about the content files. In some implementations, the content database and metadata database may be integrated.

There are a variety of application scenarios for using embedded watermark data in digital asset management. In one application scenario, the reader application operates in conjunction with the router and metadata database to dynamically link content files to information and actions. This scenario operates as follows. The user acquires watermarked content, such as images, audio or video from a computer network (e.g., an extranet, web site or e-mail). The user provides the content file as input to a watermark reader application using the user interface of the reader. In a windowing user interface environment, the user drags and drops the content file from the desktop into the reader UI (e.g., a window).

The reader extracts a watermark message embedded in the content within the file and sends it to a routing application. The routing application is accessible on a network 104 via Internet communication protocols, such as HTTP, XML, and TCP/IP. The routing application maintains a registry database 118 including a number of database records that associate watermark messages with related information. In one implementation, the routing application uses a content identifier extracted from the watermark message to look up a creator identifier. The creator identifier is associated with a metadata database management system. In particular, it is associated with a network address of the database management system to which queries are sent to fetch information and actions linked to the content via the watermark.

The routing application sends a request for related information or actions to the metadata database along with the content identifier and the network address (e.g., IP address) of the reader application. In response, the metadata database sends content/product specific information from the metadata database to the reader for display in predefined fields within reader UI. The metadata database looks up the content/product specific information based on the content identifier.

The metadata may be sent in many different forms. In one implementation, the metadata database sends HTML content back to the reader, which renders it. In another implementation, it sends content in the form of XML. For background on a routing application, see U.S. application Ser. No. 09/571, 422 (now U.S. Pat. No. 6,947,571) filed May 15, 2000.

The information returned to the reader may enumerate links to additional actions, such as hyperlinks to web sites, additional content files, or programs. Some examples of these actions include options to order another version of the watermarked content or products or services depicted in the watermarked content. For example, the user can click an option displayed in the reader UI to go to a URL specified by the metadata database for additional functionality, such as fetching more information from the metadata database or some other database, purchasing related products or services, launching a search for related content, etc.

In one implementation, a search program is implemented as part of the metadata database management system. When the user selects an action to launch a search for related content, the reader application sends the request to the metadata database management system. The metadata database looks up corresponding content descriptors for the watermarked content file based on the content identifier. It then searches for other content files represented in the metadata database that have matching descriptors, and returns pointers to the related content files to the reader application, which displays a listing of them. The user may then click on a listing to fetch and render the selected content file.

In another scenario, the functionality of the reader application described above is incorporated into an Internet browser or file browser, such as Windows Explorer in the Windows Operating System. Using a web of file browser equipped with watermark reader software (e.g., a plug-in, integrated via an Application Programming Interface, or as a shell extension to the operating system), the user browses content files. The user may browse rendered versions of the file, such as a rendering of an image file, a thumb nail of an image, or a file icon representing an audio or video file in a file directory structure. As the user scrolls over rendered content (such as an image displayed on the user's display monitor) or representations of files (e.g., file icons in a directory structure), the application dialogue appears notifying the user that the content file has additional information available. From this point forward, the browser operates in a similar fashion as the reader application described above. The browser renders metadata returned from the metadata database in the form of HTML or XML.

The router system may be implemented within a local area network in which the user's computer resides, or may be located on a wide area network such as the Internet. Similarly, the metadata database may be implemented within a local area network in which the user's computer resides, or may be located on a wide area network such as the Internet.

In some cases, the metadata returned to the user's computer may be formatted for the type of computer. For example, PDA's, cell phones and other consumer electronic devices may have differing display protocols for which the data needs to be formatted for proper rendering. One way to address this is for the reader application to communicate reader device information to the router, which in turn, provides this information to the metadata database. The metadata database may provide data in the proper format, such as a format for display using the Palm Operating system, or may route it through an intermediate data formatting server that converts the data before sending it to the reader application.

For example, in the diagram of FIG. 1, the data formatting server is connected to the network 104 (e.g., the Internet) and a network for wireless personal digital assistants (e.g., the Palm.net network). The wireless PDA extracts a content identifier from a content item (e.g., from a watermark in the content item). The PDA sends the identifier to the data formatting server in a message, which passes the message to the router 114.

The router parses the identifier from the message, looks up the network address associated with the content identifier, and returns it to the data formatting server. Next, the data formatting server retrieves the metadata associated with the content identifier from the metadata database located at the network address. Specifically, the data formatting server retrieves a web page indexed by the network address returned by the router. Next, the data formatting server reformats the metadata for display on the PDA and sends the reformatted data to the PDA for rendering. Specifically if the metadata is a web page, the data formatting server reformats the web page for display on the PDA's monitor. For other types of metadata content, the data formatting server formats the metadata content for delivery to the PDA and rendering on the PDA, such as by converting to a compressed file, or a streaming file format like Microsoft's ASF format. This example is applicable to other portable communication devices like wireless phones.

The above processes performed within the data formatting server may be performed in whole or in part on router system 114, metadata database 116, and the content database 102. For example, the router can perform the function of fetching the web page in response to looking up the web page address in the registry, and then re-formatting the web page for rendering on the PDA device, wireless phone, or other client device (e.g., set top box, TV, etc.). In addition, the router can send information about the client device, such as a device ID sent by the reader application 108, to the metadata database, which in turn, formats the metadata in a format for rendering on the PDA device or wireless phone.

In particular, the data formatting functions may be performed in a product handler executing in the router system. The product handler refers to a process described in U.S. application Ser. No. 09/571,422, and incorporated by reference into this patent application.

To improve performance, the reader application can be designed to cache watermark data to avoid repeated read operations on the same content. In particular, the reader application retains watermark message data decoded from some number of most recently used files, along with the name of the files. When the user instructs the reader to fetch related information for a selected file, the reader first checks the cache for watermark message data extracted from the file, and if present, forwards that message data to the router application. Further, the reader application may also cache metadata associated with most recently, or most frequently accessed media files. This may require additional memory, but obviates the need to decode the watermark and fetch the metadata.

While FIG. 1 shows a single metadata database, the router system may link a watermark message to two or more different metadata databases. The router system can return HTML or XML, for example, giving the user the option to choose which metadata database he or she would like information from. Alternatively, the router can issue multiple requests to each of the metadata databases listed in the registry for a particular watermark message. Each of the metadata databases then return related information to the reader application in response to the router application's request.

In one implementation, the metadata is returned to the reader application as XML. This format enables the reader to parse the metadata and format it for display within fields of the reader UI.

Some content files may have multiple different watermarks in different blocks of the content. Each of these watermarks may link to the same or different metadata, or metadata database.

Enhanced Content and Metadata Searching and Indexing

The above digital asset management systems and processes may be used advantageously in various combinations with content and metadata searching and indexing systems, such as those described in 60/198,857, 09/571,422, 09/620, 019 and 09/636,102. The following section describes systems and processes for content searching and indexing that employ imperceptibly embedded watermark data in combination with other mechanisms for identifying and indexing multimedia content, including still images, video, audio, graphics, and text.

Peer-to-peer (known as P2P) file sharing is the current rage in the Internet. Examples of such systems include Napster, AIMster, Scour.net, Gnutella, and FreeNet, to name a few. These file-sharing systems allow users to share files directly between their computers, with a central database or a distributed database that is passed from computer to computer. The file sharing is usually restricted to a certain file type, such as music or videos, and to a certain directory. These systems are based upon metadata tags in the file headers or footers, or filenames, and users are concerned about opening their hard drives. For example, most MP3 files have a standard ID3 tag, v2 in their header or v1 in their footer, which includes the song, album and artist names. Current file-sharing systems only search at the beginning, and possibly when the user connects to the file sharing network. This works when you share one small directory and only search for file names and metadata tags. These systems are also usually based upon a proprietary program reporting about one individual computer. These limitations and the fact that the systems work with a restricted file type go hand in hand because it is unknown how to expand the system and remain user friendly.

Web searching is one of the first booms in the Internet. Examples include AltaVista, Yahoo!, Excite, and Google, to name a few. Web searching allows the user to find information that is distributed on the Internet. However, the searching systems have two major problems. The web crawlers that find information can only search around 10% (a generous estimate). The web crawler also only locates surface information, such as HTML (hypertext markup language) web page, and ignores deep information, including downloadable files and database information. Inventors are trying to solve the latter problem with search engines that query web pages and then search, thus potentially finding deep database or downloadable files. However, this is slower than general searching and can never cover the web.

The unique combination of these two technologies solves the file-sharing restrictions and user-friendly problems and web searching limitations. The combination includes running web crawlers (also known as spiders) locally on numerous remote networks, domains or computers, and having these web crawlers report back to a central or distributed database. This database can be searched, via a user interface similar to the one used for current search engines, where the user enters keywords or phrases, and desired information is returned. As an extension of this user interface, a watermark detector may be used to extract a watermark bearing a content identifier, and possibly content type tags, that are used as input for a search to find related content or information about the content.

Currently, only web pages are returned as links in web-based search engines. However, with this combined system, web page links, proprietary filename links, and database links are returned. Another advantage over current web searching is that rather than the web crawlers running on the web and going from link to link, the crawlers run on the local system with the permission and guidelines of the system they are searching. Another advantage is that, since the web crawlers are running locally in a user-defined (i.e. restricted) environment, they can be designed to look at database entries and non-HTML file formats, such as word documents, MPEG movies, and MP3 audio files. An additional advantage is that web crawlers can be running on numerous, potentially every, local network, or within numerous or potentially every domain since they run locally and do not block Internet access by downloading the web information and then scanning it.

Advantages over file-sharing systems include searching the whole document for keywords. This novel system also searches for related information, such as metadata and watermarks, and searches all document types. In addition, the local programs are designed for crawling the current computer or local network, and not just a specified directory, although user-defined limitations can exist. Another advantage is that the searching is continuous, allowing the search times to be set as to not slow the system during peak hours. Thus, this novel system can handle huge amounts of data without network congestion or slow user response.

Finally, the system can be designed to search documents for out-of-band information, such as header and footer metadata, or in-band information, such as watermarks, so that the files can be classified according to this extra information and not only text. This is extremely useful for non-text media files, such as images, audio and video, since search engines currently do not know how to classify these files. For example, the watermark may contain keyword information (e.g., content type tags) about a scene in an image and whether the image is acceptable for viewing by minors (an adult content flag).

Having summarized the system and its advantages, we now describe an implementation of a system for searching and indexing multimedia content and metadata related to that content. FIG. 1 shows components of this system. In this system, a web searching agent (e.g., search agent thread 120) runs locally on a collection of distributed, registered web servers (e.g., web server 122) and reports back to a searchable database 124 available for general web searching. In particular, the agent invokes watermark detectors to extract content identifiers from watermarks imperceptibly embedded in multimedia content files 126 and fetch related metadata using the metadata linking system described above. Alternatively, the watermarks include content type flags that may be used to index the content type without resorting to a metadata database 116. In addition, the agent invokes text based searching of files and file headers and footers to index text content, such as word processor documents 128, based on key words. The agents (e.g., 120) supply the content type tags from watermarks and key word text to a searchable database (124) that indexes the content type tags and text in a content index 130. The content index has a searchable index of key words and content tags 132 that are associated with file pointers 134 of files that match the description of the key words/content tags. The file pointers provide the location of the corresponding files on the computer network.

The searchable database 124 has a search engine 136 that presents a web based interface enabling users to present key word searches or searches automated by detecting a watermark from a particular content item of interest. In the former case, the user supplies a key word search query, much like the user interfaces of Google or AltaVista, and the searchable database uses the key word query as input to a search of its index for related content. In the latter case, a watermark detector, such as reader application 108, extracts a watermark from a content file, and uses the watermark to derive content type tags for that file. The detector obtains these content type flags either directly from content type tags in the watermark message payload, or indirectly from a database look up of a content identifier from the watermark message to content type tags in the metadata database 116. The watermark detector 108 provides the search engine 136 with one or more content type tags for the content file of interest. The searchable database 124 uses the content type tags and/or the key-word search terms to search the index of content 130, and returns pointers to the content items that match the search request. Since the search engine 136 has a web interface, it is accessible from remote computers (e.g., user's computer 106) via a conventional Internet browser application, or other applications with browser capability, such as watermark reader application 108.

The search agents 120 run on computers and computer networks that are difficult to access through conventional web crawler searching. The search agents have a number of parameters that control their operation. In particular, the agents have input parameters that enable a web master to specify the directories, times, and CPU usage for searching (e.g., search designated directories 138 between 1 A.M. and 5 A.M. using no more than x % of CPU time per machine in each thread of execution). In web servers, the search agent can be programmed to minimize interference with request for files to be searched, and can be programmed to search redundant copies of content on a web site so as to not interfere with web site content that is accessible for downloading by others.

By running locally on the web server 122 or user's machine 106, the search agent can also search non-HTML files, such as Word documents, PowerPoint presentations, spread sheets, databases and watermarked media for deep searching. By running in a distributed architecture, more content can be searched and categorized. The agent preferably runs as a distributed agent on the web server or local computer network 122, using idle computer processing cycles of computers in the evening or other off-peak hours. In addition, the searching agent is intelligent. The agent can use search agent technology such as RuleSpace for text and Virage for video categorization.

Images, audio and video in the file directory of the web server or local network 122 to be searched are watermarked and categorized based on content tags stored in the router system 114 or metadata database 116. In particular, the content identifier in the watermark embedded in the content is associated with usage rules stored in the router's registry 118 and/or metadata database 116. These usage rules can be used to specify the content type and control how the content is indexed and used by those that access the content via the searchable database 124. Using this approach, more web content can be better categorized, thus improving consumers' searches and properly indexing every company's web server.

The above system is intended for enabling wider access to content on web servers to others on the Internet via the searchable database that indexes the content. However, a similar structure may be used for internal digital asset management (DAM) within a company's local or wide area computer network. In particular, in this configuration, the digital asset management system runs within the company's Intranet, and the search agent 120 runs on every employee's computer. More specifically, each employee marks directories on his computer or network directory that are to be continually searched (e.g., the designated directories 138), categorized and reported to the central Intranet search site (the searchable database having a repeatedly updated index of accessible content on the Intranet). Each employee moves important documents and watermarked content files to that directory when finished, or allows people to search on documents in process. For example, as the user creates content files like images, audio or video 140, she invokes a watermark embedder application 142 to embed a content identifier or content type tags into an imperceptible watermark embedded in the content. These watermarks enable the search agent 120 to find the content to be indexed in the designated directories, and further, enable the system to index the watermarked files in the searchable database 124, which is then searchable by others. The searchable database 124 returns pointers to where content files satisfying a search can be found in the Intranet, and fetched automatically. In summary, the system helps employees of large companies to access and share company information.

As an alternative to a watermark embedder, a file header inserter may be used to write content type tags into the header or footer of the file. In this case, the search agent is programmed to read the file header/footer for content type tags. Otherwise, operation of the system is similar.

While the above structure helps locate digital assets and associate usage rules, the system also shows the relationship between content items, like documents, images, audio, etc. For example, when a user finds a document satisfying a search request, the user interface of the search engine 136 returns an interface displaying all of the linked files, such as for HTML, word processor documents, etc., and inserted objects, such as images, audio, video, etc.

This system advantageously employs digital watermarks and key word text to index content within company networks. The watermarks carry identifiers that link the content to metadata through the router and metadata database. This metadata, in turn, enables the content to be indexed for searching.

The systems described above overcome key obstacles to effectively associating content with its metadata. One of the key obstacles with any digital asset management system is the cost of inputting the metadata associated with each digital asset file. By using watermarks to identify and link through the router system, the system overcomes this obstacle.

To illustrate, consider the following example. I take a picture with my digital camera and store the image in my digital asset management (DAM) system (e.g., content database 102 and metadata database system 116). I enter in associated metadata (maybe the name of the beach it was taken on), which is stored in the metadata database 116. The image is watermarked with an Image ID, establishing a link between the Image ID and the metadata database entry storing the name of the beach. I now distribute the image to my business partners. One partner takes the image and stores it in his DAM system. This system recognizes the watermark, links through the router to the metadata database in my DAM system—which responds by supplying all the metadata. This data is then automatically entered into my partner's system—improving productivity and accuracy, and gaining metadata that could not be determined from the image itself (the name of the beach). In this manner, the imperceptibly embedded digital watermark in content items enables disparate DAM systems to interoperate and share content items.

Moreover, the metadata for a content item stores usage rules that govern where the metadata and content file is allowed to be shared (e.g., to a particular authenticated user, to a particular authenticated machine, etc.). This authentication scheme is implemented by requiring the user who wants access to the content or its metadata to supply authentication data, such as a particular computer address, password, etc.

The system combines two powerful functions: automatically indexing content files through the search agent and searchable database, and automatically indexing the metadata associated with those content files.

The searchable database 124 may be centralized or distributed over a number of computers interconnected on a network. The content index 124 can be searched from a standard browser as noted above, or searched by agents, as in the Gnutella system. In file sharing networks, the search agent 120 can be programmed to scan files on a user's computer while the computer is connected to the file sharing network. Alternatively, the search agent can run on the user's computer in off-peak times and create a local index of content on the user's machine. Then, whenever the user connects, this index created locally by the search agent shares the user's local index with a central content index maintained by the searchable database 124 or a distributed content index database that is shared among users of the file sharing network.

Content and Asset Management System and Method

Figure 2:
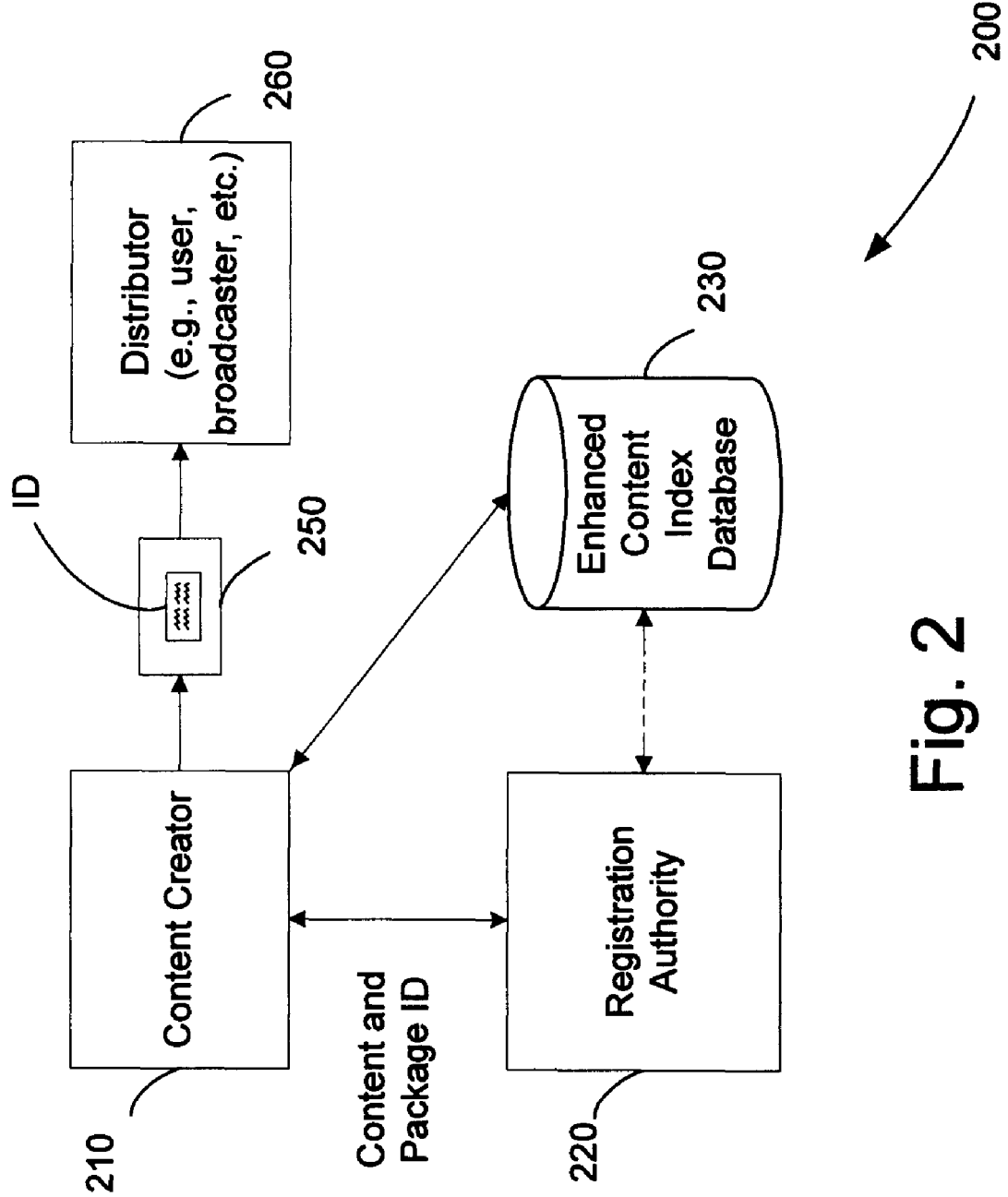
FIG. 2 illustrates a content distribution system according to an embodiment of the present invention.

An asset management system 200 is now described with reference to FIG. 2. A content creator 210 develops content (audio, video, images, etc.) for distribution. During (or after) content creation, the content is registered via a registration authority 220 to obtain a unique identifier (ID) for the content. The registration process can be electronically automated, e.g., via the internet or other network system. The registration authority 220 preferably maintains (or communicates with) a database 230, which associates the content (and/or enhanced content) with the unique IDs.

Once obtained, an identifier is steganographically encoded within the content, e.g., in the form of a digital watermark. (Of course, the content creator, the registration authority or a third party may carry out the actual encoding). In one embodiment, multiple IDs are associated with a single content item. For example, individual identifiers uniquely identify particular audio segments or video sequences. Even objects within a video frame (or still image) can be identified with a unique identifier. Such embedded identifiers may be used to trigger an action or response, or to identify content, distributors, authors, performers, etc.

The registered, embedded content may be optionally associated with enhanced content. For example, in an interactive television system ("iTV"), the content may be associated with interactive (e.g., enhanced) content, such as web pages or internet sites, graphics, audio and video, etc. In this case, an embedded identifier may correspond to a specific URL or IP address, which is maintained in database 230. (For audio-based content, the embedded identifiers may be similarly associated with enhanced content, such as a URL or IP address, performer, artist, record label, etc.). Of course, instead of storing the enhanced content, database 230 may include links to the enhanced data. The relationship between unique identifiers and enhanced content is maintained via database 230. (Of course, the registration authority 220 and the enhanced content database 230 may be in communication, and in one embodiment, may even be functionally combined.).

The embedded media content is packaged. For example, video content is reproduced on video cassettes (e.g., VHS cassettes) or DVDs, and audio content is reproduced on CDs, audio DVD, electronic or magnetic media, or tapes, etc., etc. (The term media package is used to represent both a physical package (e.g., VHS cassettes, DVD, jewel case, etc.) and/or any media content contained therein.).

The physical package 250 is also encoded, e.g., digitally watermarked. The encoding of the package can encompass artwork or printing on a package, or may include an encoded label, certificate, media documentation, shipping invoice or package container, etc. If a line design or graphic is present, it too can be encoded. (The design and/or text on a DVD or CD face can even be encoded.). A variety of watermarking encoding techniques are detailed in the patent documents discussed herein; a variety of other encoding techniques are known to those skilled in the art. Such techniques may be suitable employed with the present invention.

The digital watermark embedded within package 250 preferably includes a unique identifier (e.g., as payload bits), similarly obtained from the registration authority 220. The package watermark identifier is associated with the packaged content (or the watermark embedded therein).

There are many advantages and applications associated with watermarking media content and its respective content package. A few examples are provided below.

Figure 3:
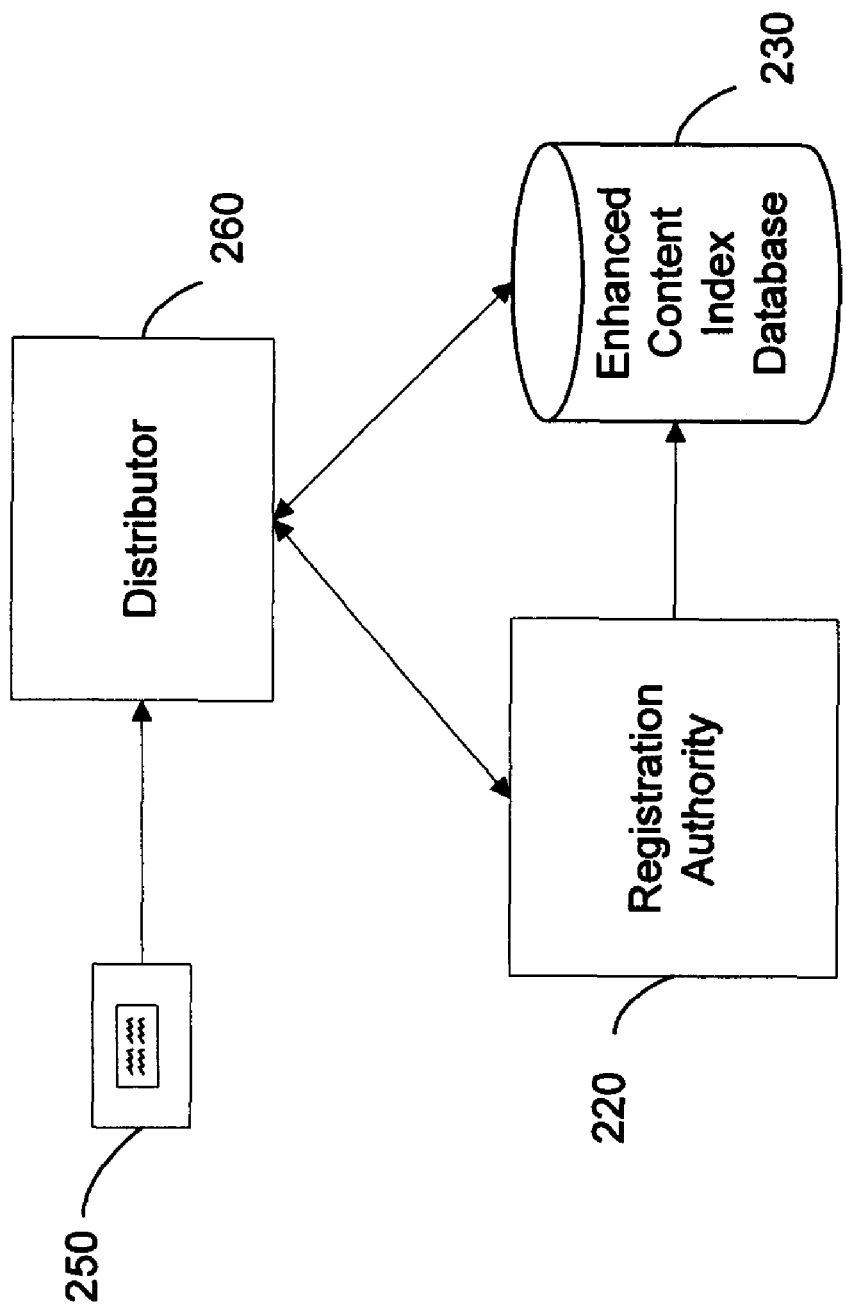
FIG. 3 illustrates a verification process according to the FIG. 2 system.

In one embodiment, procession of the physical package itself is required to facilitate verification, registration and/or authentication. Consider a video distribution example with reference to FIG. 3. A distributor (e.g., broadcaster or cable operator, etc.) 260 receives the packaged content 250 (video in this example). As discussed above, the video content includes at least a first watermark, and the package itself includes at least a second watermark. The broadcaster 260, in order to register the content and/or enable viewer access to enhanced content index database 230, presents the watermarked package to a compliant reading device (e.g., a device that is capable of reading the second watermark). The package identifier is extracted from the second watermark and conveyed to the registration authority 220, preferably along with a user, broadcaster or network ID. Upon receipt, the registration authority 220 permits access of the distributor 260 (or its viewer network) to the enhanced data stored in database 230. (The authority 220 or database 230 can log that a particular distributor or network has registered the package watermark. Then when a database query is received for the enhanced content, e.g., via a media content identifier with the distributor or network ID, the distributor or network ID is checked to determined whether registration has occurred. If so, database access is permitted.). A digital or other reproduction of the video content, without the watermarked package itself, will not allow access to the enhanced or interactive content.

In another embodiment, both IDs (i.e., package and content) are required to access the media content. In this case, however, the package ID provides a key (e.g., encryption key or watermark orientation/location or decoding key) to read the content or to access the content watermark identifier. The package watermark is initially read and information contained therein enables (e.g., decodes, unscrambles, etc.) the content or the content watermark. In a case where the package watermark identifier provides access to the content watermark, once obtained, the content watermark can then be used to unlock or unscramble the media content. Without physical possession of the package (and the watermark encoded thereon), viewing or listening to the media content is prohibited or impaired.

In still another embodiment, a compliant device (perhaps a video recorder or audio player) reads both the package watermark and the content watermark. The compliant device determines if the watermarks match (or corresponds with one another). The compliant device may even query the registration authority 220 or other database to determine if the watermarks coincide. The device operates to play the content only if the watermarks coincide.

In yet another embodiment, content is watermarked with a unique identifier as discussed above. The corresponding packaging is also watermarked with a corresponding ID. (In this section, the term "corresponding" implies that the watermarks are the same, match, relate, correspond, are compatible with, or are related to one another via a data record, etc.). The packaged content is placed in a retail distribution system. The package watermark is used to manage the content, e.g., inventory, shelf management, etc. For example, the package can be read (or scanned) by a compliant device to determine a quantity, content, inventory status, etc.

So-called fragile watermarking may also be utilized to even further enhance security of a package. A fragile watermark is one that does not survive a scan-print or copy process. Accordingly, a package may be encoded with a fragile watermark in any of the above embodiments. Although a fragile watermark is not robust enough to survive duplication, it still provides accurate watermark detection for an original package, e.g., the watermarked package. Accordingly, a would-be pirate may be able to copy the digital content, but would be unable to successfully reproduce the watermarked package itself (e.g., unable to copy the fragile watermark). (Various fragile watermarking techniques are discussed in assignee's U.S. patent application Ser. No. 09/689,226, filed Oct. 11, 2000, and 09/731,456, filed Dec. 6, 2000, and assignee's PCT Publication WO 99/36876, published Jul. 22, 1999, each of which are hereby incorporated by reference. Artisans in the field know other fragile watermarking techniques. Of course, such other techniques are suitably interchangeable with the present invention.).

(As an alternative, to deter use of precision photocopy apparatuses to reproduce a package face (while retaining the associated watermark), the face of the package can be provided with a reflective layer, e.g., in the form of an overlay or varnish. In the bright illumination of a photocopier, such layer mirrors the light back onto the photodetectors, preventing them from accurately reproducing the watermark pattern. In contrast, when presented to a web cam or other such imaging device, no bright illumination is typically present, so the photosensors are not overwhelmed and the document can be used for its intended authentication purpose.).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the watermark data encoding processes may be implemented in a programmable computer or a special purpose digital circuit. Similarly, watermark data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for processing media content, the method comprising:
    obtaining media content signals from a computer network;
    deriving, at a computing device, content identifiers from perceptible visual or audio content of the content signals;
    using, at the computing device, the content identifiers to obtain metadata used to classify the media content signals; and
    creating, via the computing device, a searchable index of the media content signals based on the metadata, wherein users access the searchable index on the computer network to submit a search query for the searchable index to retrieve links to the media content signals.

2. The method of claim 1, wherein the content identifiers are extracted from digital watermarks imperceptibly embedded in the content signals by making imperceptible changes to audio or image signals that comprise the content signals.

3. The method of claim 1, wherein the content identifiers reference metadata corresponding to the media content signals that is stored in remote locations from the media content signals.

4. The method of claim 2, wherein the digital watermarks comprises content flags that are used to classify the media content signals in the searchable index.

5. The method of claim 1, further comprising executing search agents on media content signals from different local computer networks that are each connected to the computer network, the search agents extracting the content identifiers from content signals stored within corresponding local computer networks and providing the metadata for indexing in the searchable index.

6. The method of claim 1, wherein the identifiers are used to obtain usage rules specifying how the content signals from which the identifiers are extracted are to be indexed or used by the users of the searchable index.

7. The method of claim 1, wherein the metadata is stored in a database accessible to the users, and users update the metadata in the database by supplying metadata about corresponding content signals that then becomes subsequently accessible to other users that submit search queries for content signals on the computer network.

8. A method for searching for audio or images, the method comprising:
    from a location in a distributed computer network, receiving a query for content signals related to a first content signal, wherein the first content signal is part of the query;
    receiving a content identifier derived from perceptible audio or image data of the first content signal;
    using, at a computer, the content identifier to obtain metadata used to classify the first content signal;
    searching, via the computer, a searchable index of media content signals based on the metadata, which forms search criteria for the first content signal; and
    returning, via the computer, a set of search results including references to content signals stored in the distributed computer network that correspond to the search criteria.

9. The method of claim 8, wherein the content identifier is extracted from a digital watermark imperceptibly embedded in the first content signals by making imperceptible changes to audio or image signals that comprise the first content signal.

10. The method of claim 8, wherein the content identifier references metadata corresponding to the first content signal that is stored in a remote location from the first content signal.

11. The method of claim 9, wherein the digital watermark comprises a content flag that is used to classify the first content signal as part of the search criteria used to search for related content signals in the searchable index.

12. The method of claim 8, wherein the searchable index is built by executing search agents within different local computer networks that are each connected to the distributed computer network, the search agents extracting content identifiers from content signals stored within corresponding local computer networks and providing metadata for indexing in the searchable index.

13. The method of claim 8, wherein the identifier extracted from the first content signal is used to obtain a usage rule specifying how the first content signal is to be used by the users of the searchable index.

14. The method of claim 8, wherein the metadata is stored in a database accessible to the users, and users update the metadata in the database by supplying metadata about corresponding content signals that then becomes subsequently accessible to other users that submit search queries for content signals on the distributed computer network.

15. A tangible computer-readable medium having instructions stored thereon that, if executed by a computing device, cause the computing device to perform operations comprising:
    obtaining media content signals from a computer network;
    deriving content identifiers from perceptible visual or audio content of the content signals;
    using the content identifiers to obtain metadata used to classify the media content signals; and
    creating a searchable index of the media content signals based on the metadata, wherein users access the searchable index on the computer network to submit a search query for the searchable index to retrieve links to the media content signals.

16. The tangible computer-readable medium of claim 15, wherein the content identifiers are extracted from digital watermarks imperceptibly embedded in the content signals by making imperceptible changes to audio or image signals that comprise the content signals.

17. The tangible computer-readable medium of claim 15, wherein the content identifiers reference metadata corresponding to the media content signals that is stored in remote locations from the media content signals.

18. A tangible computer-readable medium having instructions stored thereon that, if executed by a computing device, cause the computing device to perform operations comprising:

receiving, from a location in a distributed computer network, a query for content signals related to a first content signal, wherein the first content signal is part of the query;

receiving a content identifier derived from perceptible audio or image data of the first content signal;

using the content identifier to obtain metadata used to classify the first content signal;

searching a searchable index of media content signals based on the metadata, which forms search criteria for the first content signal; and returning a set of search results including references to content signals stored in the distributed computer network that correspond to the search criteria.

19. The tangible computer-readable medium of claim 18, wherein the content identifier is extracted from a digital watermark imperceptibly embedded in the first content signals by making imperceptible changes to audio or image signals that comprise the first content signal.

20. The tangible computer-readable medium of claim 18, wherein the content identifier references metadata corresponding to the first content signal that is stored in a remote location from the first content signal.

* * * * *

UNITED STATES PATENT AND TRADEMARK OFFICE
CERTIFICATE OF CORRECTION

| | | |
|---|---|---|
| PATENT NO. | : 8,041,074 B2 | Page 1 of 1 |
| APPLICATION NO. | : 12/120150 | |
| DATED | : October 18, 2011 | |
| INVENTOR(S) | : Rhoads et al. | |

It is certified that error appears in the above-identified patent and that said Letters Patent is hereby corrected as shown below:

Page 3, item (56), under "Other Publications", in Column 1, Line 17, delete "meta data," and insert -- metadata, --.

Column 1, line 5, delete "TECHNICAL FIELD" and insert -- CROSS-REFERENCE TO RELATED APPLICATIONS --.

Column 1, line 21, delete "application" and insert -- Application --.

Column 1, line 30, delete "application" and insert -- Application --.

Column 1, line 34, delete "application" and insert -- Application --.

Signed and Sealed this
Seventeenth Day of July, 2012

David J. Kappos
*Director of the United States Patent and Trademark Office*